(12) United States Patent
Bender et al.

(10) Patent No.: US 7,734,843 B2
(45) Date of Patent: Jun. 8, 2010

(54) COMPUTER-IMPLEMENTED METHOD, APPARATUS, AND COMPUTER PROGRAM PRODUCT FOR STALLING DMA OPERATIONS DURING MEMORY MIGRATION

(75) Inventors: Carl Alfred Bender, Highland, NY (US); Patrick Allen Buckland, Austin, TX (US); Steven Mark Thurber, Austin, TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 11/420,236

(22) Filed: May 25, 2006

(65) Prior Publication Data

US 2008/0005383 A1 Jan. 3, 2008

(51) Int. Cl.
*G06F 13/28* (2006.01)
*G06F 15/167* (2006.01)
*G06F 12/00* (2006.01)
*G06F 9/26* (2006.01)

(52) U.S. Cl. .............................. 710/22; 710/23; 710/24; 709/212; 711/135; 711/202; 711/206

(58) Field of Classification Search .................. 710/22, 710/23, 24; 709/212; 711/135, 202, 206
See application file for complete search history.

(56) References Cited

U.S. PATENT DOCUMENTS

| | | | | |
|---|---|---|---|---|
| 5,923,859 | A | * | 7/1999 | Melo et al. ................... 710/113 |
| 6,587,961 | B1 | * | 7/2003 | Garnett et al. ................. 714/11 |
| 6,932,471 | B2 | | 8/2005 | Zelman |
| 2004/0019751 | A1 | * | 1/2004 | Sharma et al. ............... 711/154 |
| 2004/0037156 | A1 | * | 2/2004 | Yoneda et al. ............... 365/232 |
| 2004/0064601 | A1 | * | 4/2004 | Swanberg ..................... 710/22 |
| 2006/0069818 | A1 | * | 3/2006 | Mather et al. ................. 710/22 |

\* cited by examiner

*Primary Examiner*—Niketa I Patel
(74) *Attorney, Agent, or Firm*—Yee & Associates, P.C.; Libby Z. Toub

(57) ABSTRACT

A computer-implemented method, apparatus, and computer program product are disclosed for migrating data from a source physical page to a destination physical page. A migration process is begun to migrate data from the source physical page to the destination physical page which causes a host bridge to enter a first state. The host bridge then suspends processing of direct memory access operations when the host bridge is in the first state. The data is migrated from the source physical page to the destination physical page while the host bridge is in the first state.

17 Claims, 9 Drawing Sheets

100 DATA PROCESSING SYSTEM

COMPUTER-IMPLEMENTED METHOD, APPARATUS, AND COMPUTER PROGRAM PRODUCT FOR STALLING DMA OPERATIONS DURING MEMORY MIGRATION

BACKGROUND OF THE INVENTION

1. Field of the Invention

The present invention relates generally to data processing systems and, more specifically, to a computer-implemented method, apparatus, and computer program product for stalling DMA operations during memory migration.

2. Description of the Related Art

According to a trend in computer systems, a system can be reconfigured while running without disrupting data processing. For example, with multiple operating systems running on the computer, while a first one of the operating systems is using a particular block of memory there can arise a need to reallocate the block of memory for use by a second one of the operating systems. In this case, the first operating system must first stop using the block of physical memory before the memory can be reallocated. Or, for example, a problem may be detected in a block of physical memory in which case it may be desirable to remove the memory from operation so that it can be replaced. Once again, whatever operating system was using the block of memory must stop using it.

In certain respects it is relatively straightforward to stop using one block of physical memory and start using another, since mechanisms related to virtual memory management already exist in conventional operating systems to handle aspects of this problem that relate to operating system access to this memory, but these mechanisms depend upon the block of memory being used for only program data that is subject to access by operating systems and that is not subject to access by I/O devices. If the block of memory is subject to access by I/O devices, the problem is more difficult. This access by I/O devices is commonly direct memory access (DMA), although this may not always be the case.

Direct Memory Access (DMA) is the transferring of data from an I/O device to another entity (for example, memory, or another I/O device) without the direct assistance of software. DMA requires gaining control of the I/O bus for the use of the originating I/O device, in order to perform the DMA operation. For shared buses like conventional PCI and PCI-X, control of the I/O bus is obtained by arbitrating for the I/O bus. Turning off the agent that performs the arbitration, i.e. the arbiter, which allows arbitration for the I/O bus, will turn off, i.e. prevent, DMA for all entities that use that I/O bus. For I/O buses like PCI Express where there is only one device per bus, also called a link, access to the bus is obtained by having buffer credits, and stopping DMA involves not giving back any buffer credits to the device at the other end of the bus.

Memory Mapped I/O (MMIO) load without the use of split transactions is the transferring of data from an I/O device to the processor without the target of the operation, i.e. the I/O device that is to supply the data, having to generate its own transaction on the I/O bus to return the requested data. These MMIO operations require the requester, for example, the I/O bridge on behalf of the processor, to continually ask the target (sometimes called polling the target) for the data until the target on one of the polling operations has the data available and returns it to the requester in the requestor's arbitration cycle. The target does not independently access the I/O bus during this operation, and therefore does not need to gain control of the bus. The target returns the data by executing an MMIO load reply operation. The requested data is included in the MMIO load reply.

Memory Mapped I/O (MMIO) load with the use of split transactions is the transferring of data from an I/O device to the processor where the target of the operation, i.e. the I/O device that is to supply the data, may delay passing the data back to the requester. The target must generate its own transaction on the I/O bus to return the requested data. Once the target has the data to be returned, the target generates an MMIO load reply operation on the I/O bus to transfer the data to the requester.

Data that is subject to access by I/O devices may need to be migrated from one physical page to another. When data that is subject to access by I/O devices needs to be migrated, DMA access to that data needs to be suspended during the migration process. The prior art does not offer a solution to migrate this data efficiently, particularly for systems that implement memory mapped I/O (MMIO) using split transactions.

In systems that do not implement split transactions for memory mapped I/O (MMIO) operations, once the requester gains control of the bus, the requester issues its MMIO load request. The requester then maintains control of the operation until the I/O device replies to the MMIO load request with the requested data. In this manner, the target is not required to gain control of the bus.

In systems that implement split transactions, the requester issues its MMIO load request once the requester gains control of the bus. Once the requester issues its MMIO load request, the requester relinquishes control of the bus. The target I/O device, once it has the requested data, then must gain control of the bus in order to reply to the request and send its data to the requester.

If DMA is stopped by turning off the access to the bus by an I/O device, in systems that use split transactions, the portion system that uses the stalled portion of the I/O system, will stall. This is because an I/O device that needs to gain control of the bus in order to execute an MMIO load reply will never be able to gain control of the bus. If the I/O device cannot gain control of the bus and, thereby, cannot execute its MMIO load reply, that MMIO load operation will never be able to complete, thereby stalling the processor issuing the MMIO load operation.

Furthermore, if the DMA is stopped closer to the processor rather than immediately adjacent to the I/O device, such that the I/O device can still access the bus, then DMA write requests that get stalled can prevent the MMIO load split response from returning to the processor. The reason for this is that PCI operation ordering rules require that an MMIO load reply cannot be returned to the processor doing the load operation until all previous DMA write operations have been completed from the same I/O device. Thus, MMIO load replies can get stuck in a queue behind previous DMA write requests that are waiting to be processed, but which cannot be processed due to the memory migration operation.

SUMMARY OF THE INVENTION

A computer-implemented method, apparatus, and computer program product are disclosed for migrating data from a source physical page to a destination physical page. The method, apparatus, and computer program product provide for stalling direct memory access (DMA) operations in a host bridge, without stopping MMIO load operations, while data is migrated from one physical page to another in systems that implement MMIO load operations, also called MMIO load requests, with the use of split transactions.

A migration process is begun to migrate data from the source physical page to the destination physical page, which causes a host bridge to enter a first state. When the host bridge is in the first state, it suspends its processing of direct memory access (DMA) operations. The data migration process is then begun such that the data is being copied from the source physical page to the destination physical page.

While in the first state, if an MMIO load operation is in need of processing, the host bridge is moved to a second state, which causes the host bridge to resume its processing of DMA and MMIO operations. The process of entering the second state signals to the data migration process that the data migration process needs to be restarted.

If, however, the host bridge is still in the first state upon completion of the copying of the data from the source physical page to the destination physical page, then the host bridge is moved to a third state. When the host bridge is in the third state, the host bridge completely stalls its processing of all I/O operations, including DMA and MMIO operations, which permits the final states of the data migration process to be completed including changing the addresses from pointing to the source page to now point to the destination page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
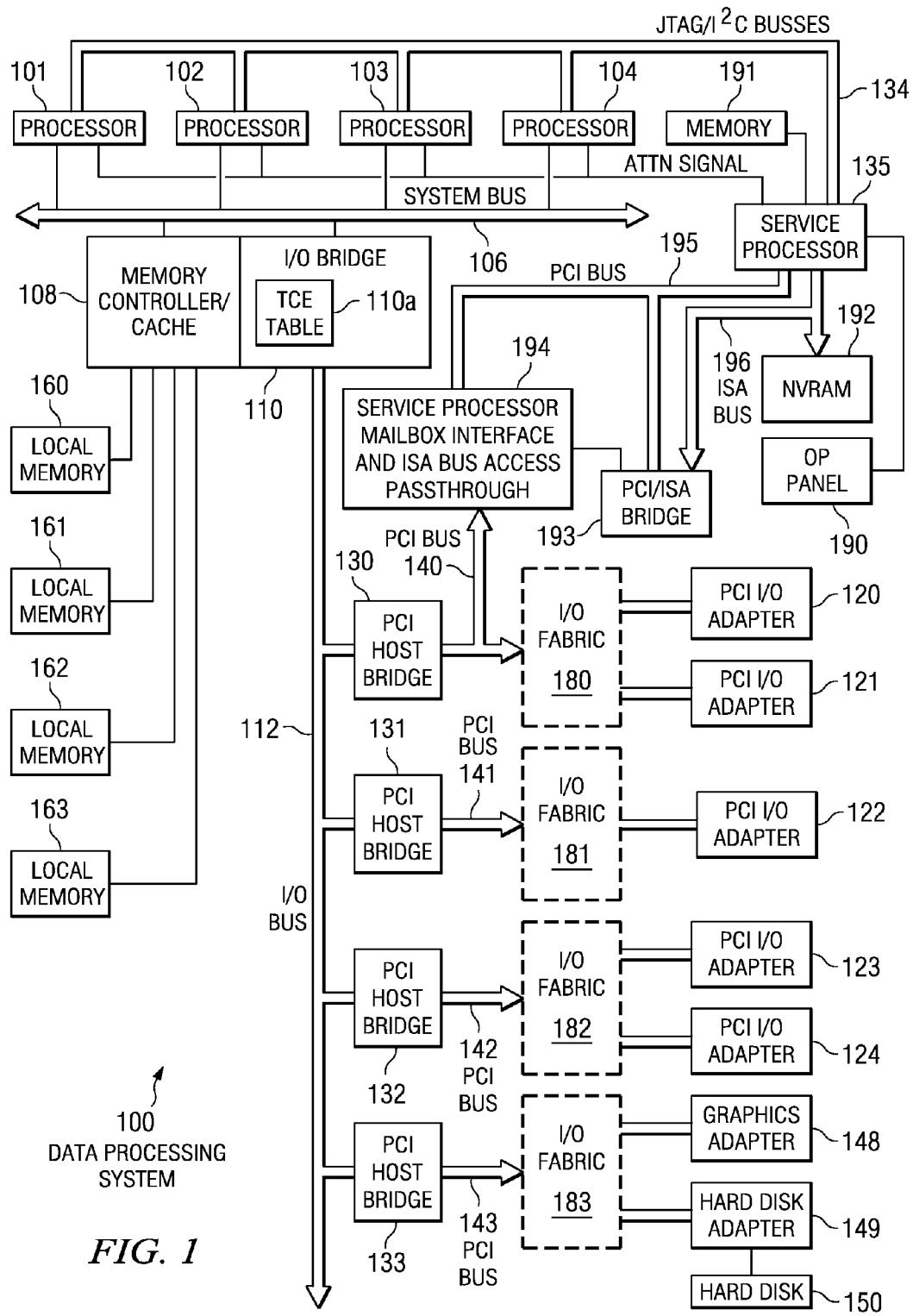
FIG. 1 depicts a block diagram of a data processing system that includes the illustrative embodiment.

The illustrative embodiment is a computer-implemented method, apparatus, and computer program product for stalling DMA operations in a host bridge, without stopping MMIO load operations, while migrating data from a source physical page to a destination physical page in a system that executes MMIO load operations using split transactions. According to the illustrative embodiment, the data migration process is restarted when there is the need to process an MMIO load operation while DMA operations are stalled.

The illustrative embodiment provides for a soft stop state and a hard stop state for implementation within a host bridge, such as a PCI host bridge (PHB).

In a first embodiment of the present invention, all DMA operations through a host bridge are suspended during migration of data from a source page to a destination page when a DMA write operation is encountered, regardless of whether or not the DMA write operation attempted to access the source page. When data needs to be migrated from a source physical page to a destination physical page, software sets the soft stop bit within the host bridge. The host bridge enters the soft stop state when the soft stop bit is set and a DMA write operation occurs at the host bridge. While in the soft stop state, the host bridge suspends direct memory access (DMA) traffic from the I/O devices, which are connected to that host bridge, to memory. During the time that the soft stop state is active, the host bridge will continue to process MMIO store traffic. If the host bridge receives an MMIO load operation while the host bridge is in the soft stop state, the soft stop state will be suspended in order to allow the MMIO load operation to be processed. If the soft stop state is suspended in order to allow an MMIO load operation to be processed, the migration process will need to be restarted.

If the migration is able to complete without the soft stop state being suspended, the host bridge will enter the hard stop state so that software can complete the final steps of the migration process, including changing addresses. When the host bridge enters the hard stop state, all DMA and all MMIO traffic, including both MMIO load and load reply operations, through that host bridge is suspended. While the host bridge is in the hard stop state, the software can complete the final steps of the migration process.

The first illustrative embodiment of the present invention describes a soft stop bit, a hard stop bit, and a soft stop fault bit that are included in a host bridge. A host bridge enters the soft stop state when its soft stop bit is set equal to 1 and the host bridge receives a DMA write operation to process. A soft stop fault bit indicates whether the host bridge received an MMIO load operation while the host bridge was in the soft stop state. A host bridge is not in the soft stop state when its soft stop bit is set equal to 0. A host bridge is not in the hard stop state when its hard stop bit is set equal to 0.

A table is described herein that includes multiple entries. The table is referred to as a translation and control table. Each entry in the table associates a particular source physical page with a particular I/O adapter. The entries are referred to as translation and control entries (TCEs). The table is indexed by the I/O bus address of DMA operations.

More specifically, when software needs to migrate data from a source physical page to a destination physical page, the software sets the soft stop bit equal to 1 in all host bridges that might access the source page. The software then flushes any remaining DMA writes from those host bridges by issuing an MMIO load operation to all host bridges that might be using table entries that point to the source page. The software then copies the data from the source page to the destination page.

In each host bridge that might access the source page, the software checks to see if the soft stop fault bit was set equal to 1 during the migration of the data. The soft stop fault bit would have been set equal to 1 had the host bridge received an MMIO load operation while the data was being migrated. If the soft stop fault bit is set equal to 1, the software must restart the migration process.

If the soft stop fault bit is set equal to 0, the hardware sets the hard stop bit equal to 1 when the soft stop bit is read by the software. The hard stop bit is set equal to 1 to cause the host bridge to enter the hard stop state. While the host bridge is in the hard stop state, the value in the table entries that had pointed to the source page are changed to point to the destination page. Once the table entries are changed, the software resets the soft stop bits, hard stop bits, and soft stop fault bits in the affected host bridges to be equal to 0.

In a second embodiment of the present invention, DMA operations through a host bridge are suspended during migration of data from a source physical page to a destination physical page only if a DMA operation attempts to write to the particular source physical page that has the data that is being migrated. If no DMA operation attempts to write to the source page during the migration progress, DMA operations will continue to be processed by the host bridge during the migration of the data.

In the second embodiment, each translation and control entry (TCE) includes a new control bit, referred to herein as the migration-in-progress (MIP) bit. The translation information in a TCE points to a particular physical page. When data in a physical page is to be migrated, the MIP bit in the TCEs that point to that physical page are set equal to 1. When a MIP bit in a TCE is set equal to 0, the data in the page to which the TCE points is not currently being migrated.

Address translation and control logic and DMA control logic are both included in each host bridge. When the address translation and control logic in a host bridge fetches a TCE that has its MIP bit set equal to 1, the DMA control logic sets the host bridge's soft stop bit equal to 1 to cause the host bridge to enter the soft stop state. When the host bridge enters the soft stop state, the host bridge continues to process MMIO store traffic through the host bridge unless the host bridge receives an MMIO load operation to one of its I/O devices.

During the soft stop state, the host bridge suspends DMA operations from the I/O devices, which are connected to that host bridge, to system memory. During the time that the soft stop state is active, the host bridge will continue to process MMIO store operations. If the host bridge receives an MMIO load operation to the I/O device while the host bridge is in the soft stop state, the soft stop state will be suspended in order to allow the MMIO load operation to be processed. In this case the soft stop fault bit will be set to a 1 to signal to the software that the migration process will need to be restarted.

If the migration is able to complete without the soft stop state being suspended, the software will read the soft stop fault bit and it will be a value of 0, in which case the host bridge hardware will set the hard stop bit and the host bridge will enter the hard stop state. When the host bridge enters the hard stop state, all DMA and all MMIO traffic through that host bridge is suspended. While the host bridge is in the hard stop state, the software can complete the final steps of the migration process.

More specifically, when software needs to migrate data from a source page to a destination page, the software sets the MIP bit equal to 1 in all TCEs that point to the source page in all host bridges. The software then flushes any remaining DMA writes from those host bridges by issuing an MMIO load operation to all host bridges that might be using TCEs that point to the source page. The software copies the data from the source page to the destination page. The software then checks each host bridge to see if the host bridge's soft stop fault bit was set equal to 1 during the migration of the data. The soft stop fault bit would have been set equal to 1 had the host bridge received a DMA write operation which targeted the source page and also received an MMIO load operation during the migration. If the soft stop fault bit is set equal to 1, the software must restart the migration process. If the soft stop fault bit is set equal to 0, the hardware sets the hard stop bit equal to 1 when the software reads the soft stop fault bit, which causes the host bridge to enter the hard stop state. While the host bridge is in the hard stop state, the TCEs are then changed to point to the destination page. After the TCEs are changed to point to the destination page, the MIP bits in the TCEs are set equal to 0. Once the TCE table entries are changed, the software resets the soft stop bits, hard stop bits, and soft stop fault bits to be equal to 0.

With reference now to the figures, FIG. 1 depicts a block diagram of a data processing system which includes the illustrative embodiment. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110, which includes translation and control entry (TCE) table 110a, is connected to system bus 106 and provides an interface to I/O bus 112. Memory controller/cache 108 and I/O bus bridge 110 may be integrated as depicted.

I/O bridge 110 includes a table 110a. Translation and control entries (TCEs) are stored in TCE table 110a. Table 110a is an I/O address translation and protection mechanism that provides, on an I/O page basis, the capability to control I/O operations to a physical page from an I/O device.

The TCE entries associate the physical pages of physical memory 160-163 with the I/O bus address pages available on the I/O bus 112 to the I/O adapters 120-124, 148-150. Each entry associates a particular physical page with a particular I/O address page. TCE table 110a is indexed by the I/O bus address of DMA operations. This table is used as an indirect addressing mechanism in much the same way as the virtual address mechanism in the processors provides an indirect addressing mechanism from the software to the physical memory. Such processor virtual address translation mechanisms are well known in the art.

Data processing system 100 is a logically partitioned (LPAR) data processing system; however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI input/output adapters (IOAs) 120, 121, 122, 123 and 124, graphics adapter 148 and hard disk adapter 149, or parts thereof, may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 are assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123 and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different logical partition. Thus, each operating system executing within data processing system 100 may access only those IOAs that are within its logical partition. For example, one instance of the Advanced Interactive Executive (AIX) operating system may be executing within partition P1, a second instance (copy) of the AIX operating system may be executing within partition P2, and a Linux or OS/400 operating system may be operating within logical partition P3.

Peripheral component interconnect (PCI) host bridges (PHBS) 130, 131, 132 and 133 are connected to I/O bus 112 and provide interfaces to PCI local buses 140, 141, 142 and 143, respectively. PCI buses 140, 141, 142, and 143 preferably conform to the PCI specification. In the embodiments described below, PCI buses 140, 141, 142, and 143 conform to the PCI specification that utilizes split transactions for MMIO operations.

PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. The I/O fabrics 180-183 provide interfaces to PCI buses 140-143. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. This PCI bus also connects PCI host bridge 130 to service processor mailbox interface and ISA bus access pass-through logic 194 and I/O fabric 180. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C buses 134. JTAG/I$^2$C buses 134 are a combination of JTAG/scan buses (see IEEE 1149.1) and Phillips I$^2$C buses. However, alternatively, JTAG/I$^2$C buses 134 may be replaced by only Phillips I$^2$C buses or only JTAG/scan buses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C buses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
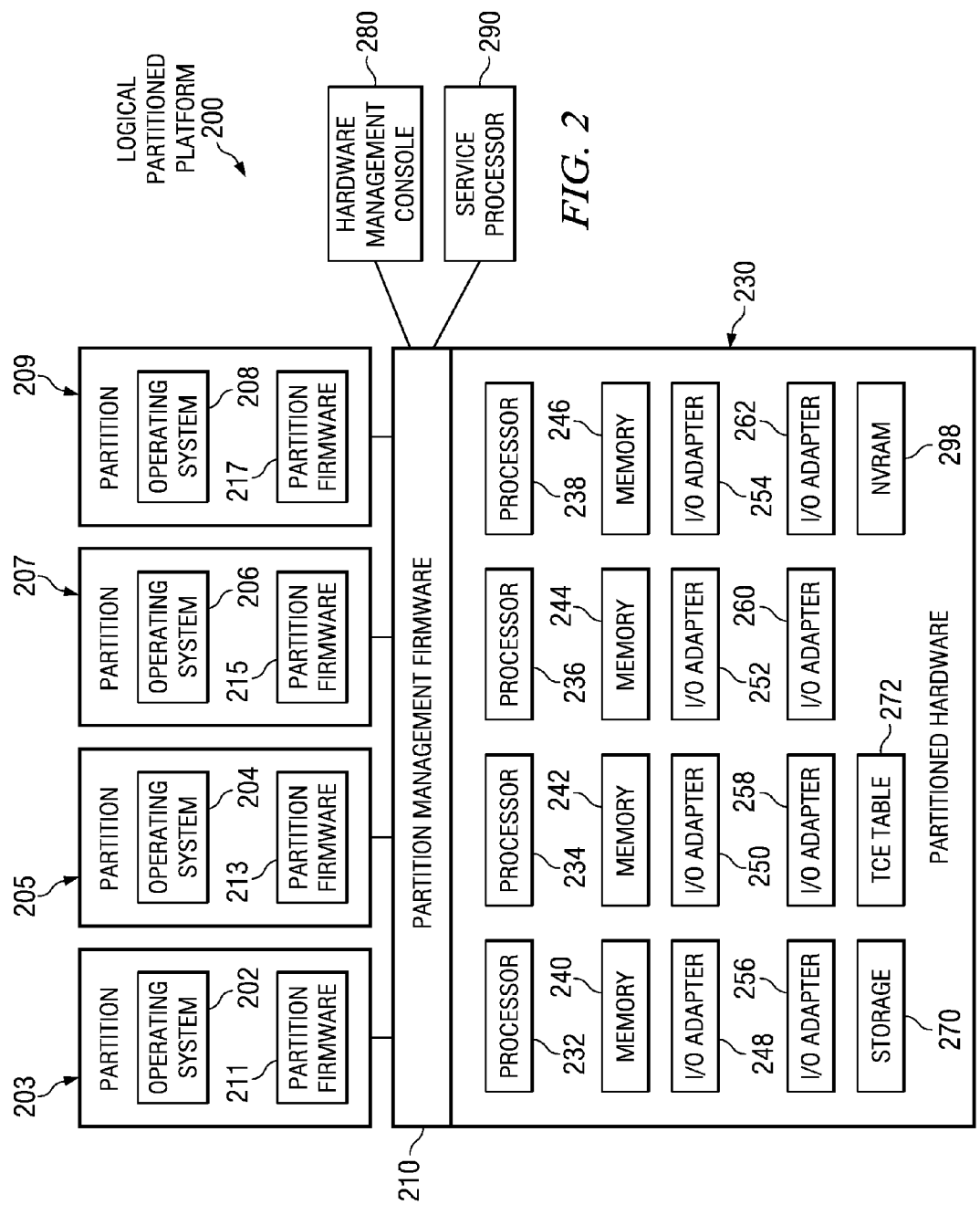
FIG. 2 depicts a block diagram of a logically partitioned platform that includes the illustrative embodiment.

FIG. 2 depicts a block diagram of a logically partitioned platform that includes the illustrative embodiment. The hardware in logical partitioned platform 200 may be implemented as, for example, data processing system 100 in FIG. 1. Logically partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which is designed to interface with a partition management firmware 210, also called a hypervisor. OS/400 is used only as an example in these illustrative embodiments. Other types of operating systems, such as AIX and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, a copy of boot strap code is loaded onto partitions 203, 205, 207, and 209 by partition management firmware 210. Thereafter, control is transferred to the boot strap code with the boot strap code then loading the open firmware and RTAS. The processors associated with or assigned to the partitions are then dispatched to the partition's memory to execute the partition firmware.

Partitioned hardware 230 includes a plurality of processors 232-238, a plurality of system memory units 240-246, a plurality of IOAs 248-262, a storage unit 270, and TCE table 272. Each of the processors 232-238, memory units 240-246, NVRAM storage 298, and IOAs 248-262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In an LPAR environment, it is not permissible for resources or programs in one partition to affect operations in another partition. Furthermore, to be useful, the assignment of resources needs to be fine-grained. For example, it is often not acceptable to assign all IOAs that are attached to a particular PCI host bridge (PHB) to the same partition, as that will restrict configurability of the system, including the ability to dynamically move resources between partitions.

Accordingly, some functionality is needed in the PCI host bridges that connect IOAs to the I/O bus so as to be able to assign resources, such as individual IOAs or parts of IOAs to separate partitions; and, at the same time, prevent the assigned resources from affecting other partitions such as by obtaining access to resources of the other partitions.

Figure 3:
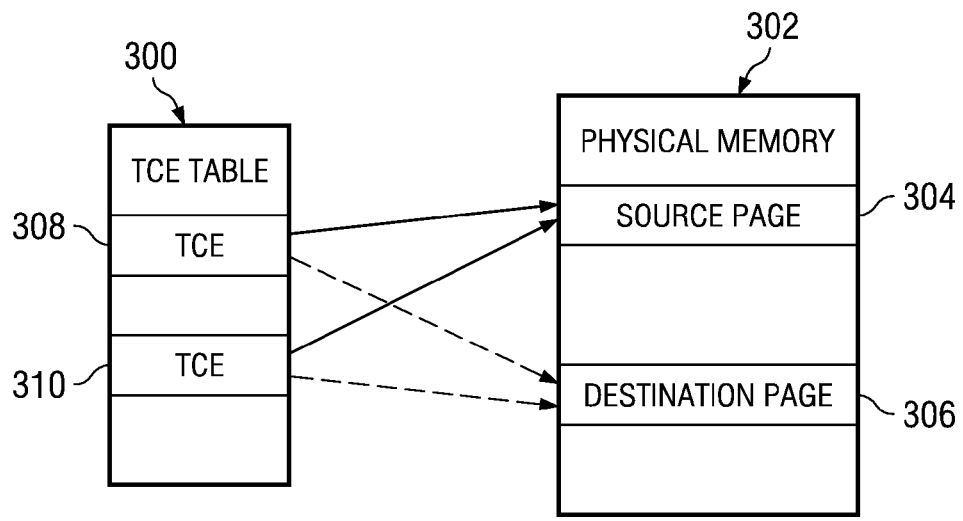
FIG. 3 depicts a block diagram of a translation and control entry (TCE) table and physical memory in accordance with the illustrative embodiment.

FIG. 3 depicts a block diagram of a translation and control entry (TCE) table and physical memory in accordance with the illustrative embodiment. Page migration is the process of copying the data from one physical page and storing it in a different physical page.

Physical memory 302 includes a physical page 304 and physical page 306. In the depicted example, the contents of physical page 304 are going to be migrated to physical page 306. The underlying mechanism that allows this migration to occur is the redirection of the I/O adapter's I/O bus address via the TCE table.

TCE table 300 contains entries that are fetched based on the page address placed on the I/O bus. Contained in the TCE table are entries that translate the I/O bus page address to a new system memory page address. For example, prior to migrating data from source page 304 to destination page 306, TCE 308 points to physical page 304, and TCE 310 points to physical page 304. After migrating data from source page 304 to destination page 306, the addresses in TCE table 300 have been changed so that TCE 308 now points to physical page 306 and TCE 310 now points to physical page 306.

Figure 4:
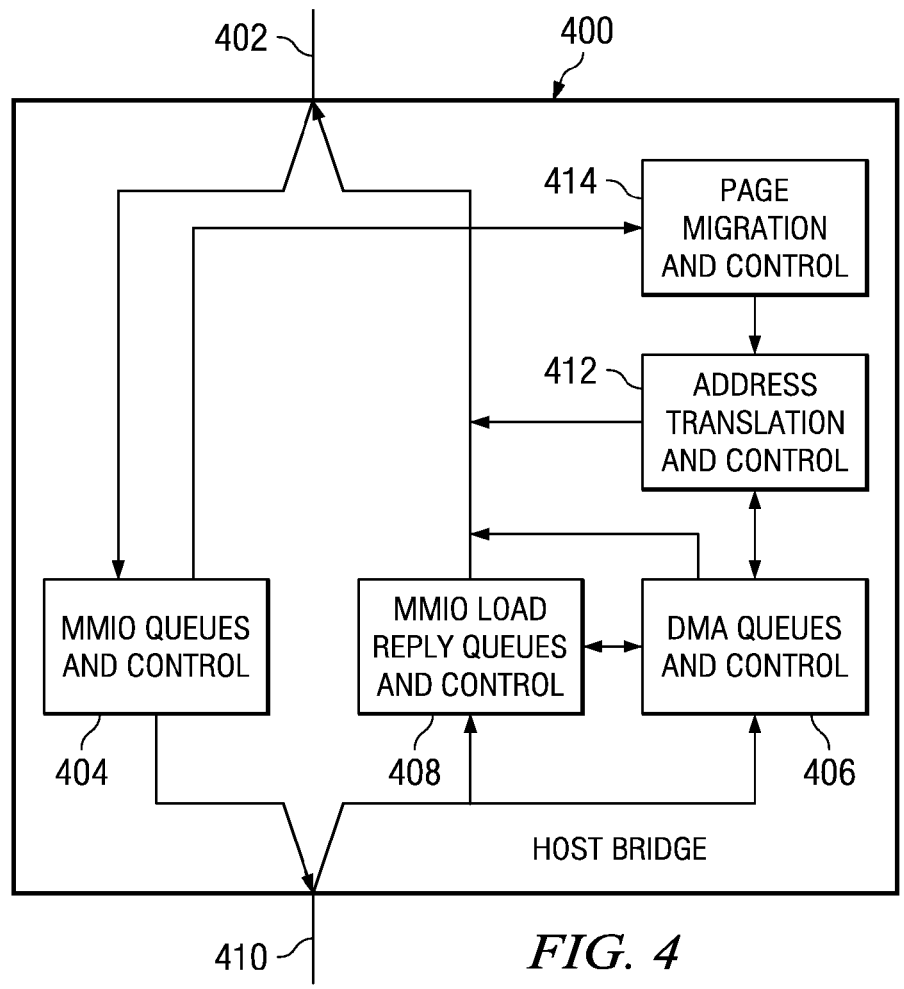
FIG. 4 illustrates a host bridge that includes the illustrative embodiment.

FIG. 4 illustrates a host bridge, such as a PCI host bridge (PHB), that includes the illustrative embodiment. Host bridge 400 communicates with a host through a primary bus 402. Primary bus can be an I/O bus, such as I/O bus 112 (see FIG. 1), that is coupled to an I/O bridge. Memory mapped I/O (MMIO) load and store requests and DMA read replies are received by host bridge 400 through primary bus 402. The MMIO load and store requests are queued and controlled by MMIO queues and control 404. DMA write and read requests, which are queued at DMA queues and control 406, and MMIO load replies, which are queued at MMIO load reply queues and control 408, flow out of host bridge 400 through primary bus 402.

Host bridge 400 communicates with one or more I/O adapters through a secondary bus 410. DMA read and write requests and MMIO load replies flow into host bridge 400 through secondary bus 410. Secondary bus 410 is preferably a PCI bus that implements a PCI specification, such as PCI Express, that utilizes split transactions for MMIO operations.

Host bridge 400 includes address translation and control 412 which fetches TCEs to be used to translate and control DMA operations. Address translation and control 412 is coupled to page migration and control 414.

Figure 5:
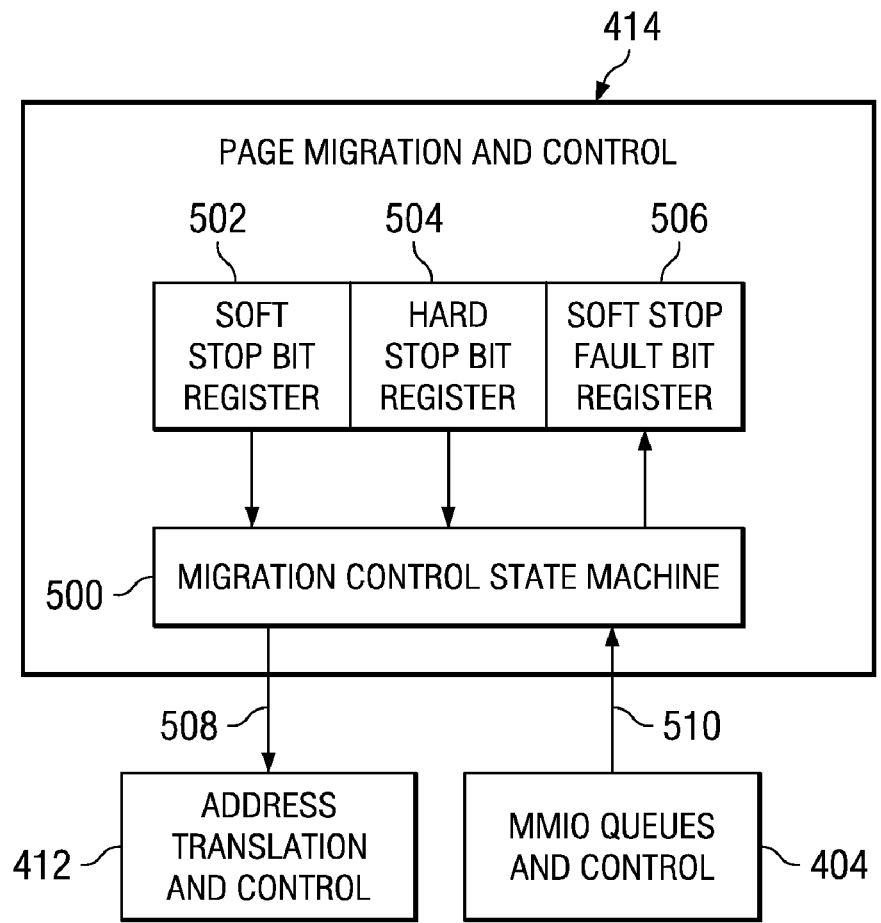
FIG. 5 depicts a page migration and control mechanism and an address translation and control mechanism in accordance with the illustrative embodiment.

FIG. 5 depicts a page migration and control mechanism and an address translation and control mechanism in accordance with the illustrative embodiment. Page migration and control mechanism 414 is coupled to address translation and control 412 (see FIG. 4). Page migration and control mechanism 414 includes a migration control state machine 500, a soft stop bit register 502, a hard stop bit register 504, and a soft stop fault bit register 506. The current values of the soft stop bit, hard stop bit, and soft stop fault bits are stored in and can be read from their respective registers 502, 504, or 506.

The soft stop bit is set equal to 1 while the data in a source physical page is being migrated from the source page to a destination physical page. While the soft stop bit is set equal to 1, the soft stop bit signals migration control state machine 500, through link 508, to stall the DMA pipeline if a DMA write operation is received into DMA queue 406. While the pipeline is stalled, host bridge 400 will not process further DMA write traffic that is received through secondary link 410 unless an MMIO load request is being processed from MMIO queues and control 404 (see FIG. 4). If an MMIO load request is being processed from MMIO queues and control 404, then the DMA stall needs to be released so that the MMIO load reply message can be received, otherwise the MMIO queues may fill causing the software to be unable to access the host bridge control logic, thereby causing a deadlock and eventual timing-out of the MMIO load request. This would create an error scenario.

Migration control state machine 500 may sense, through link 510, that an MMIO load has been received by host bridge 400 while host bridge 400 is in the soft stop state. In this case, migration control state machine 500 sets the soft stop fault bit equal to 1, which indicates to software that the migration needs to be restarted.

If the soft stop bit is equal to 1 and the soft stop fault bit is equal to 0 when the software reads register 506, page migration and control logic 414 will set the hard stop bit, which signals migration control state machine 500 that migration control state machine 500 should not process any DMA requests even if there is an MMIO load reply signal.

Figure 6:
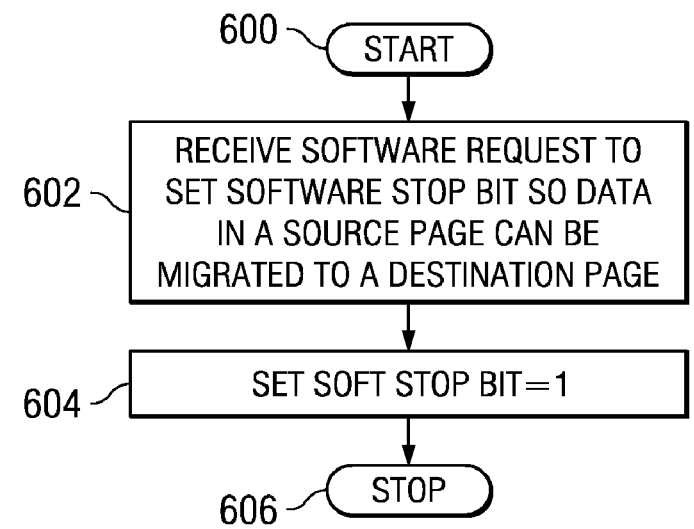
FIG. 6 is a high level flow chart that depicts setting a soft stop bit that enables a host bridge to enter a soft stop state in accordance with the illustrative embodiment.

FIG. 6 is a high level flow chart that depicts setting a soft stop bit to cause a host bridge to enter a soft stop state in accordance with the illustrative embodiment. The process starts as depicted by block 600 and thereafter passes to block 602 which illustrates receiving a software request to set the software stop bit so data in a source page can be migrated to a destination page. Next, block 604 depicts setting the soft stop bit equal to 1. The process then terminates as illustrated by block 606.

Figure 7:
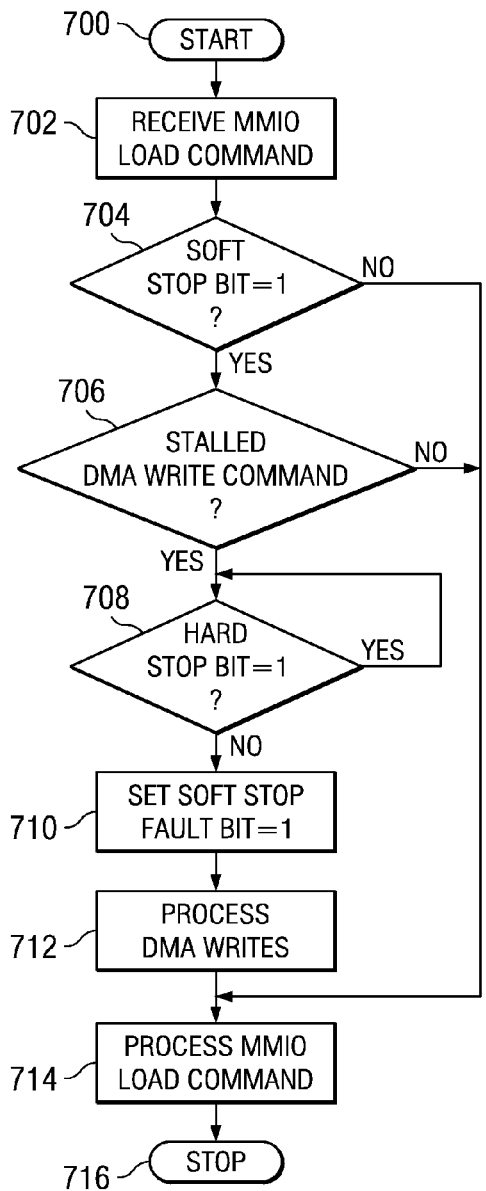
FIG. 7 is a high level flow chart that illustrates setting a soft stop fault bit in accordance with the illustrative embodiment.

FIG. 7 is a high level flow chart that illustrates setting a soft stop fault bit in accordance with the illustrative embodiment. The process starts as depicted by block 700 and thereafter passes to block 702 which illustrates receiving a memory mapped input/output (MMIO) load command. Next, block 704 depicts a determination of whether or not the soft stop bit is equal to 1. If a determination is made that the soft stop bit is not equal to 1, the process passes to block 714. If a determination is made that the soft stop bit is equal to 1, the process passes to block 706.

Block 706 illustrates a determination of whether or not there is a stalled DMA write command in the pipeline. If a determination is made that there is not a stalled DMA write command, the process passes to block 714. If a determination is made that there is a stalled DMA write command, the process passes to block 708 which depicts a determination of whether or not the hard stop bit is equal to 1. If a determination is made that the hard stop bit is equal to 1, the process passes back to block 708 until such time that the hard stop bit is equal to 0.

Referring again to block 708, if a determination is made that the hard stop bit is not equal to 1, i.e. it is equal to 0, the process passes to block 710 which depicts setting the soft stop bit fault bit equal to 1. Next, block 712 illustrates processing DMA writes. The process then passes to block 714. Block 714, then, illustrates processing the MMIO load command. The process then terminates as illustrated by block 716.

Figure 8:
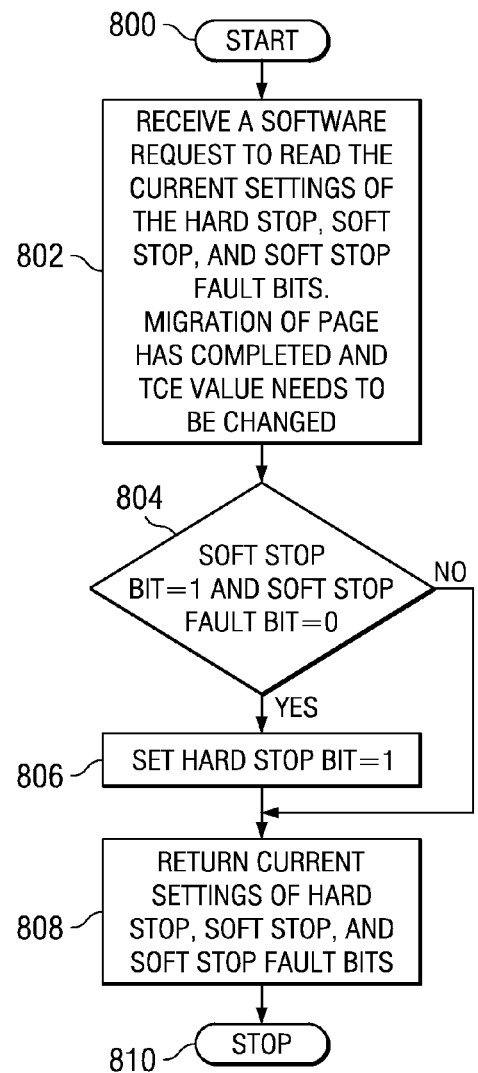
FIG. 8 is a high level flow chart that depicts setting a hard stop bit that causes a host bridge to enter a hard stop state in accordance with the illustrative embodiment.

FIG. 8 is a high level flow chart that depicts setting a hard stop bit in accordance with the illustrative embodiment. The process of FIG. 8 is executed after the data has been migrated from the source page to the destination page, and the TCE value needs to be updated to point to the destination page. The process starts as depicted by block 800 and thereafter passes to block 802 which illustrates receiving a software request to read the current settings for the hard stop bit, soft stop bit, and soft stop fault bit.

Next, block 804 depicts a determination of whether or not the soft stop bit is equal to 1 and the soft stop fault bit is equal to 0. If a determination is made that the soft stop bit is equal to 1 and the soft stop fault bit is equal to 0, the process passes to block 806 which illustrates setting the hard stop bit equal to 1. The process then passes to block 808.

Referring again to block 804, if a determination is made that the soft stop bit is equal to 1 and the soft stop fault bit is equal to 0, the process passes to block 808 which depicts returning the current settings of the hard stop bit, soft stop bit, and soft stop fault bit. The process then terminates as illustrated by block 810.

Figure 9:
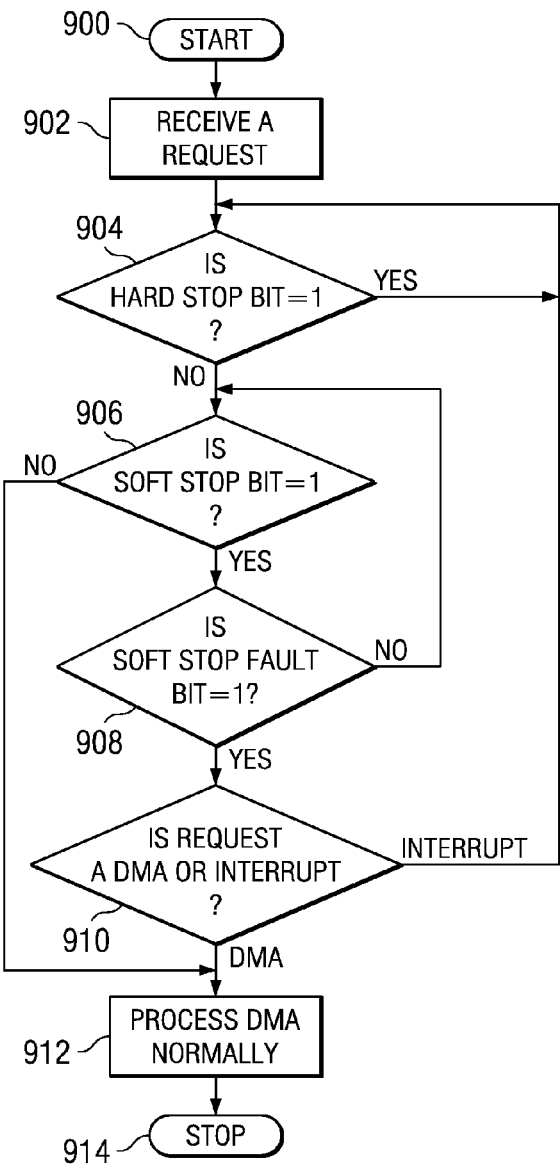
FIG. 9 is a high level flow chart that depicts a host bridge processing new DMA and interrupt requests based on the current settings of the soft stop, hard stop, and soft stop fault bits that are included within the host bridge in accordance with the illustrative embodiment.

FIG. 9 is a high level flow chart that depicts a host bridge processing new DMA and interrupt requests based on the current settings of the soft stop, hard stop, and soft stop fault bits that are included within the host bridge in accordance with the illustrative embodiment. The process starts as depicted by block 900 and thereafter passes to block 902 which illustrates receiving a request. Next, block 904 depicts a determination of whether or not the hard stop bit is set equal to 1. If a determination is made that the hard stop bit is set equal to 1, the process passes back to block 904 until such time that the hard stop bit is no longer equal to 1, i.e. it is equal to 0.

Referring again to block 904, if a determination is made that the hard stop bit is not equal to 1, i.e. it is equal to 0, the process passes to block 906 which illustrates a determination of whether or not the soft stop bit is equal to 1. If a determination is made that the soft stop bit is not equal to 1, the process passes to block 912.

Referring again to block 906, if a determination is made that the soft stop bit is equal to 1, the process passes to block 908 which depicts a determination of whether or not the soft stop fault bit is equal to 1. If a determination is made that the soft stop fault bit is not equal to 1, the process passes back to block 906. If a determination is made that the soft stop fault bit is equal to 1, the process passes to block 910.

Block 910 illustrates a determination of whether or not the received request is a DMA request or an interrupt. If a determination is made that the received request is an interrupt, the process passes back to block 904. If a determination is made that the received request is a DMA request, the process passes to block 912 which depicts processing the DMA normally. The process then terminates as illustrated by block 914.

Figure 10:
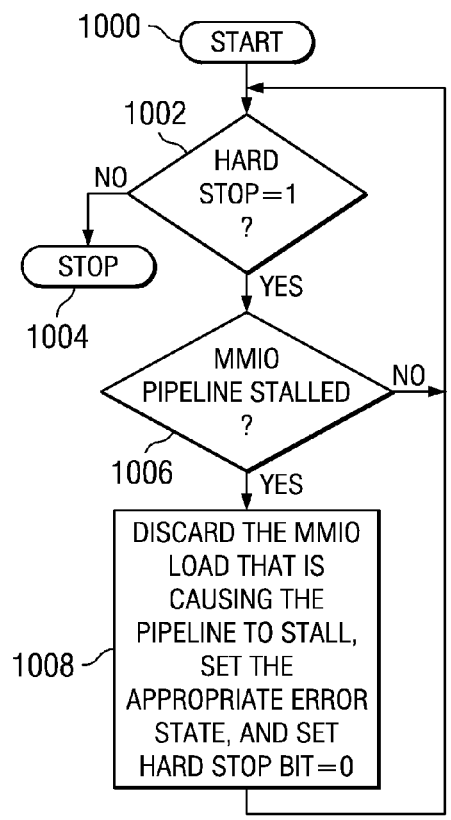
FIG. 10 is a high level flow chart that illustrates a host bridge that is in the hard stop state exiting the hard stop state if the host bridge's memory mapped I/O (MMIO) queues become full in accordance with the illustrative embodiment.

FIG. 10 is a high level flow chart that illustrates a host bridge that is in the hard stop state exiting the hard stop state if the host bridge's memory mapped I/O (MMIO) queues become full in accordance with the illustrative embodiment. The process starts as depicted by block 1000 and thereafter passes to block 1002 which depicts a determination of whether or not the hard stop bit is equal to 1. If a determination is made that the hard stop bit is not equal to 1, i.e. it is equal to 0, the process terminates as illustrated by block 1004.

Referring again to block 1002, if a determination is made that the hard stop bit is equal to 1, the process passes to block 1006 which illustrates a determination of whether or not the MMIO pipeline has stalled because the MMIO queues are full. The MMIO pipeline is stalled if the MMIO queues are full and cannot receive any new additional MMIO requests. If a determination is made that the MMIO pipeline has not stalled, the process passes back to block 1002. If a determination is made that the MMIO pipeline has stalled, the process passes to block 1008 which depicts discarding the MMIO load that is causing the pipeline to stall, setting the appropriate error state, and setting the hard stop bit to be equal to 0. Recovery from the discarded MMIO load is platform dependent. However, recovery will typically include detecting the error, resetting the I/O subsystem, and restarting the outstanding I/O operations. The resetting of the I/O subsystem will include resetting the hard stop bit to be equal to 0. The process then passes back to block 1002.

Figure 11:
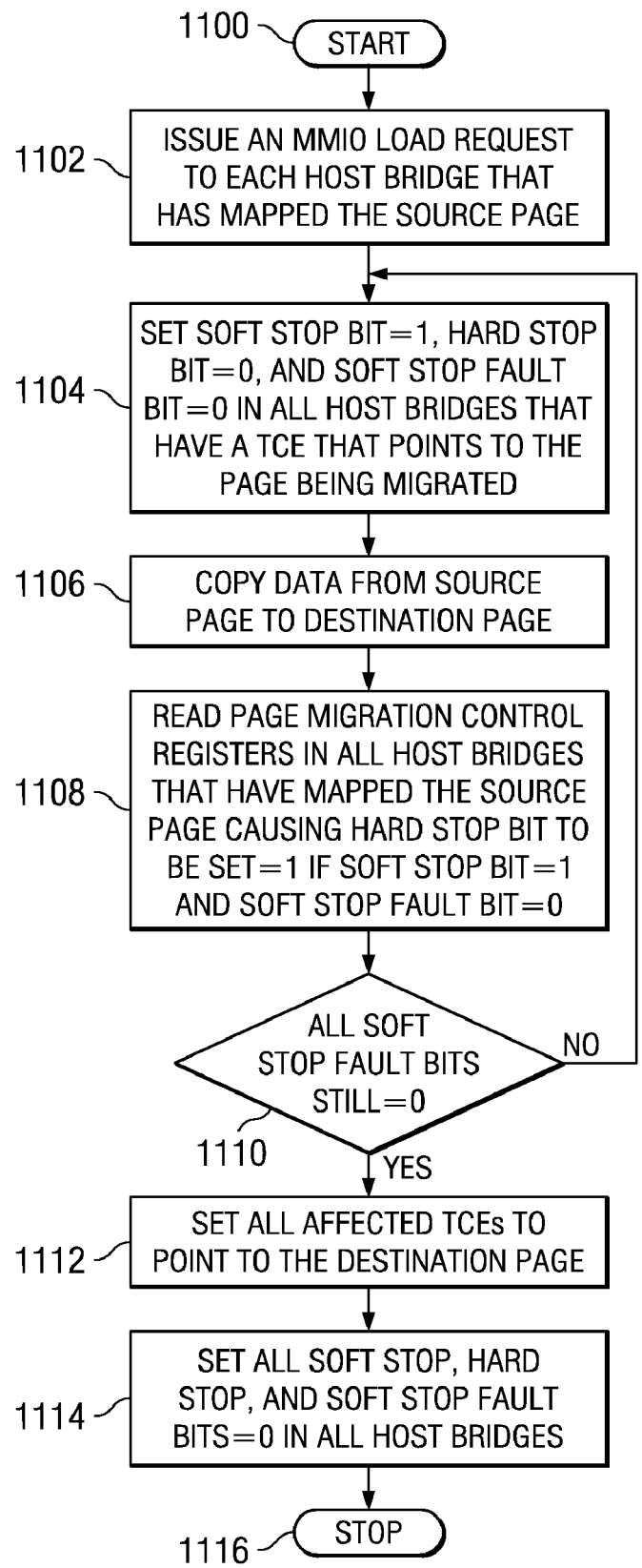
FIG. 11 is a high level flow chart that depicts temporarily stalling DMA operations when migrating data from a source page to a destination page regardless of whether or not the source page is being accessed in accordance with the illustrative embodiment.

FIG. 11 is a high level flow chart that depicts temporarily stalling DMA operations when migrating data from a source page to a destination page regardless of whether or not the source page is being accessed in accordance with the illustrative embodiment. The process starts as depicted by block 1100 and thereafter passes to block 1102 which illustrates issuing an MMIO load request to each host bridge that has mapped the source page. This MMIO load will cause any outstanding DMA write operations to be flushed.

Next, block 1104 depicts setting the soft stop bit equal to 1, the hard stop bit equal to 0, and the soft stop fault bit equal to 0 in all host bridges that have a TCE that points to the page that is being migrated.

The process then passes to block 1106 which illustrates copying the data from the source page to the destination page. Thereafter, block 1108 illustrates reading the page migration control registers in all host bridges that have mapped the source page. The process of reading these registers causes the hard stop bit to be set equal to 1 if the soft stop bit is equal to 1 and the soft stop fault bit is equal to 0.

Next, block 1110 depicts a determination of whether or not all soft stop fault bits are still equal to 0. If a determination is made that all soft stop fault bits are not still equal to 0, the process passes back to block 1104. Referring again to block 1110, if a determination is made that all soft stop fault bits are still equal to 0, the process passes to block 1112 which illustrates setting all affected TCEs to point to the destination page. Next, block 1114 depicts setting all soft stop, hard stop, and soft stop fault bits equal to 0 in all host bridges. The process then terminates as illustrated by block 1116.

According to a second illustrative embodiment of the present invention, a new control bit is added to each translation and control entry in the TCE table. This bit is referred to herein as a migration-in-progress (MIP) bit. The value of the MIP bit in a TCE indicates whether or not the data in the physical page to which the TCE points is currently being migrated. When the MIP bit is set equal to 1, the data is currently being migrated. When the MIP bit is set equal to 0, the data is not currently being migrated.

Figure 12:
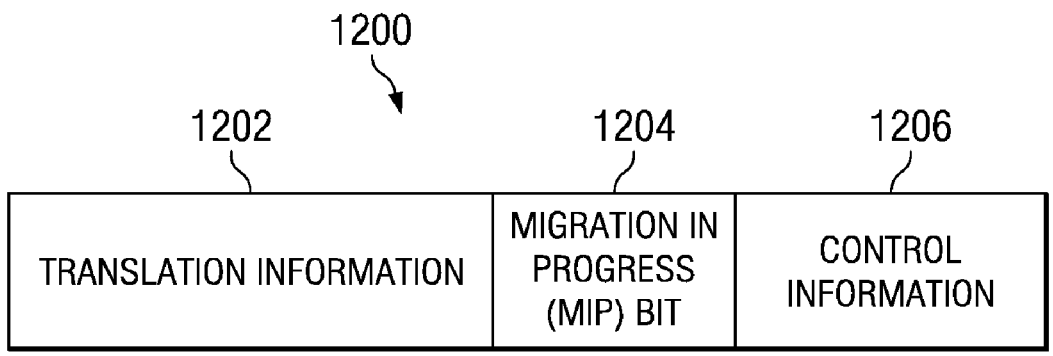
FIG. 12 depicts a translation and control entry (TCE) that includes a migration-in-progress (MIP) bit in accordance with the illustrative embodiment.

FIG. 12 depicts a translation and control entry (TCE) 1200 that includes a migration-in-progress (MIP) bit in accordance with the illustrative embodiment. Each translation and control entry (TCE) includes translation information 1202 used for translating an address in a command, also called a request, to a particular physical page, a migration-in-progress (MIP) bit 1204, and read/write control information 1206.

Figure 13:
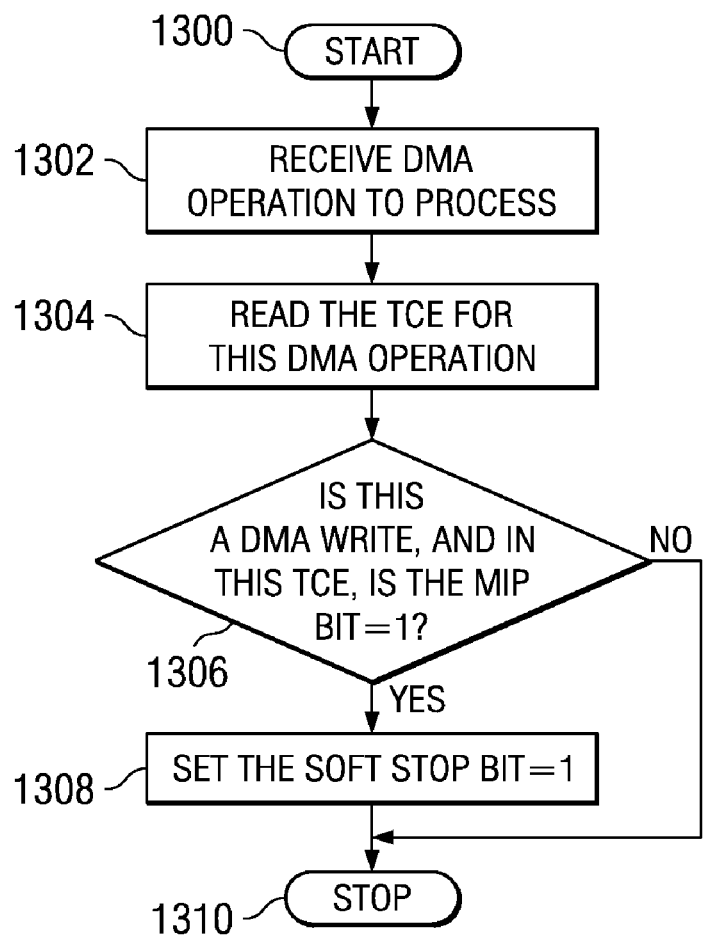
FIG. 13 is a high level flow chart that illustrates a host bridge utilizing a translation and control entry's migration-in-progress (MIP) bit to determine whether the host bridge should enter the soft stop state in accordance with the illustrative embodiment.

FIG. 13 is a high level flow chart that illustrates a host bridge utilizing a translation and control entry's migration-in-progress (MIP) bit to determine whether the host bridge should enter the soft stop state in accordance with the illustrative embodiment. The process starts as illustrated by block 1300 and thereafter passes to block 1302 which depicts receiving a DMA operation to process. Next, block 1304 illustrates reading the TCE for this DMA operation.

Block 1306, then, illustrates a determination of whether or not this is a DMA write and whether the migration-in-progress (MIP) bit is equal to 1. If a determination is made that this is not a DMA write and the migration-in-progress (MIP) bit is equal to 1, the process terminates as depicted by block 1310. Referring again to block 1306, if a determination is made that this is a DMA write and the migration-in-progress (MIP) bit is equal to 1, the process passes to block 1308 which illustrates setting the soft stop bit equal to 1. The process then terminates as depicted by block 1310.

Figure 14:
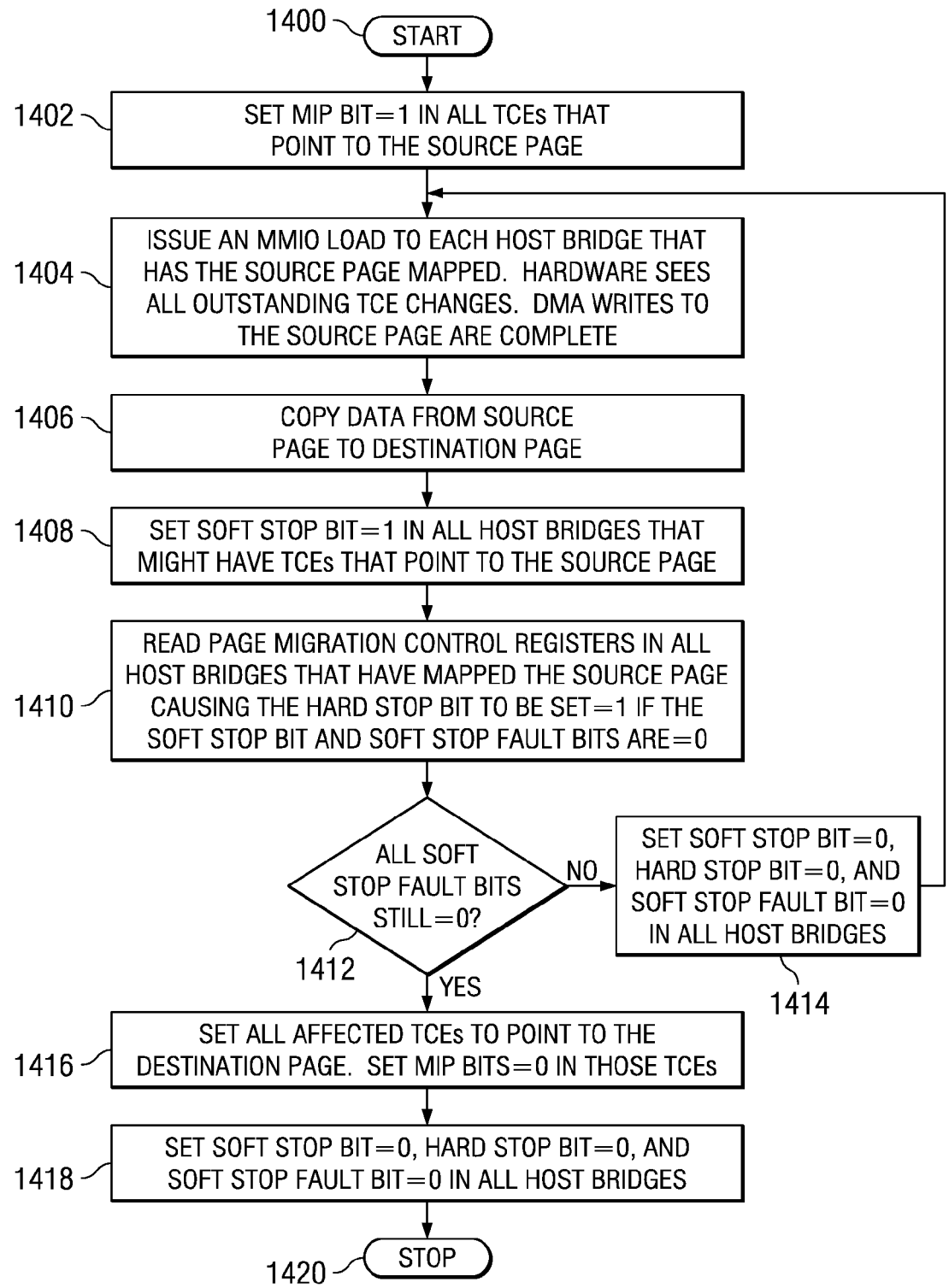
FIG. 14 is a high level flow chart that illustrates temporarily stalling DMA operations, when migrating data from a source page to a destination page, only if the source page is being accessed by an I/O device that is writing to the source page in accordance with the illustrative embodiment.

FIG. 14 is a high level flow chart that illustrates temporarily stalling DMA operations, when migrating data from a source physical page to a destination physical page, only if the source page is being accessed by an I/O device that is writing to the source page in accordance with the illustrative embodiment. The process starts as depicted by block 1400 and thereafter passes to block 1402 which illustrates setting the migration-in-progress (MIP) bit equal to 1 in all TCEs that point to the source page. The process of changing the MIP bits causes any cached copies of those TCEs to be invalidated.

Next, block 1404 depicts issuing a memory mapped input/output (MMIO) load request to each host bridge that has the source page mapped. This MMIO load will cause any hardware invalidations of the TCEs to get to the host bridge prior to the MMIO load reply being returned to the processor, and will make sure that all writes to the TCE prior to its invalidation have been flushed to memory.

The process then passes to block 1406 which illustrates copying the data from the source page to the destination page. Next, block 1408 depicts setting the soft stop bit equal to 1 in all host bridges that might have TCEs that point to the source page. Thereafter, block 1410 illustrates reading the page migration control registers in all host bridges that have mapped the source page. The process of reading these registers causes the hard stop bit to be set equal to 1 if the soft stop bit and the soft stop fault bits are equal to 0.

Next, block 1412 depicts a determination of whether or not all soft stop fault bits are still equal to 0. If a determination is made that not all soft stop fault bits are still equal to 0, the process passes to block 1414 which illustrates setting the soft stop bit equal to 0, the hard stop bit equal to 0, and the soft stop bit equal to 0 in all host bridges. The process then passes back to block 1404.

Referring again to block 1412, if a determination is made that all soft stop fault bits are still equal to 0, the process passes to block 1416 which depicts setting all affected TCEs to point to the destination page. All migration-in-progress (MIP) bits are then set equal to 0 in those TCEs. Thereafter, block 1418 illustrates setting the soft stop bit equal to 0, the hard stop bit equal to 0, the soft stop bit equal to 0, and the soft stop fault bit equal to 0 in all host bridges. The process then terminates as depicted by block 1420.

The invention can take the form of an entirely hardware embodiment or an embodiment containing both hardware and software elements. In a preferred embodiment, the invention is implemented in hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be storage medium such as an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for migrating data from a source physical page to a destination physical page, said computer-implemented method comprising:
   beginning a migration process to migrate data from said source physical page to said destination physical page;
   responsive to a migration bit set within an entry in a translation and control table for said source physical page, setting a host bridge to a first state;
   suspending processing of direct memory access requests by said host bridge when said host bridge is in said first state;
   interrupting said first state to set said host bridge to a second state when a memory mapped input/output load request is received by said host bridge while said host bridge is in said first state; and
   processing direct memory access requests and memory mapped input/output requests while said host bridge is in said second state, wherein direct memory access writes for host bridges associated with said source physical page are flushed.

2. The method according to claim 1, further comprising:
   responsive to said host bridge set to said second state, requiring said migration process to be restarted.

3. The method according to claim 1, further comprising:
   starting to copy data from said source physical page to said destination physical page in response to starting said migration process;
   in response to a completion of said copying of said data from said source physical page to said destination physical page, determining if said host bridge is still in said first state; and
   in response to a determination that said host bridge is still in said first state setting said host bridge to a third state.

4. The method according to claim 3, further comprising:
   in response to setting said host bridge to said third state, stalling, by said host bridge, processing of all input/output operations by said host bridge.

5. The method according to claim 4, further comprising:
   completing said migration process.

6. The method according to claim 5, further comprising:
   changing addresses for said data of said source physical page to point to said destination physical page; and
   setting said host bridge to no state.

7. The method according to claim 1, further comprising:
   including said migration bit within each entry in said translation and control table, wherein each entry in said translation and control table is associated with a particular physical page; and
   setting said host bridge to said first state when a direct memory access write request attempts to write to said source physical page and said migration bit is set within an entry in said translation and control table that is associated with said source physical page.

8. The method according to claim 7, further comprising:
   receiving, by said host bridge, a direct memory access request;
   determining, using said migration bit associated with said source physical page, whether said direct memory access request is attempting to write to said source physical page;
   in response to a determination that said direct memory access request is attempting to write to said source physical page, setting said host bridge to said first state; and
   in response to a determination that said direct memory access request is not attempting to write to said source physical page, executing, by said host bridge, said direct memory access request.

9. A computer program product for migrating data from a source physical page to a destination physical page, said computer program product comprising:
   a computer usable storage medium having computer usable program code stored thereon, the computer usable program code comprising:
   computer usable program code responsive to a migration bit set within an entry in a translation and control table for said source physical page, for setting a host bridge to a first state;
   computer usable program code for suspending processing of direct memory access requests by said host bridge when said host bridge is in said first state;
   computer usable program code for interrupting said first state to set said host bridge to a second state when a memory mapped input/output load request is received by said host bridge while said host bridge is in said first state; and
   computer usable program code for processing direct memory access requests and memory mapped input/output requests while said host bridge is in said second state, wherein direct memory access writes for host bridges associated with said source physical page are flushed.

10. An apparatus for migrating data from a source physical page to a destination physical page, said apparatus comprising:
- means for beginning a migration process to migrate data from said source physical page to said destination physical page;
- a page migration mechanism responsive to a migration bit set within an entry in a translation and control table for said source physical page, setting a host bridge to a first state;
- said host bridge suspending processing of direct memory access requests by said host bridge when said host bridge is in said first state;
- said page migration mechanism interrupting said first state to set said host bridge to a second state when a memory mapped input/output load request is received by said host bridge while said host bridge is in said first state; and
- said host bridge processing direct memory access requests and memory mapped input/output requests while said host bridge is in said second state.

11. The apparatus according to claim 10, further comprising:
- said page migration mechanism responsive to said host bridge set to said second state, requiring said migration process to be restarted.

12. The apparatus according to claim 10, further comprising:
- said migration process starting to copy data from said source physical page to said destination physical page in response to starting said migration process;
- in response to a completion of said copying of said data from said source physical page to said destination physical page, said page migration mechanism determining if said host bridge is still in said first state; and
- in response to a determination that said host bridge is still in said first state, said page migration mechanism setting said host bridge to a third state.

13. The apparatus according to claim 12, further comprising:
- in response to setting said host bridge to said third state, said host bridge stalling processing of all input/output operations.

14. The apparatus according to claim 13, further comprising:
- said migration process being completed.

15. The apparatus according to claim 14, further comprising:
- said migration process changing addresses for said data of said source physical page to point to said destination physical page; and
- setting said host bridge to no state.

16. The apparatus according to claim 10, further comprising:
- said migration bit that is included within each entry in said translation and control table, wherein each entry in said translation and control table is associated with a particular physical page; and
- said page migration mechanism setting said host bridge to said first state only when a direct access memory write request attempts to write to said source physical page and said migration bit is set within an entry in said translation and control table that is associated with said source physical page.

17. The apparatus according to claim 16, further comprising:
- said host bridge receiving a direct memory access request;
- said migration bit that is associated with said source physical page utilized to determine whether said direct memory access request is attempting to write to said source physical page;
- in response to a determination that said direct memory access request is attempting to write to said source physical page, said page migration mechanism setting said host bridge to said first state; and
- in response to a determination that said direct memory access request is not attempting to write to said source physical page, said host bridge executing said direct memory access request.

* * * * *